United States Patent [19]

Biesenberger et al.

[11] Patent Number: 5,707,573
[45] Date of Patent: Jan. 13, 1998

[54] METHOD OF PREPARING THERMOPLASTIC FOAMS USING A GASEOUS BLOWING AGENT

[76] Inventors: Joseph A. Biesenberger, 14 King Ct., Wayne, N.J. 07470; Subir K. Dey, 21 K Reading Rd., Edison, N.J. 08817; David B. Todd, 35-H Chicopee Dr., Princeton, N.J. 08540

[21] Appl. No.: 552,473

[22] Filed: Nov. 9, 1995

[51] Int. Cl.$^6$ .................................................. B29C 44/20
[52] U.S. Cl. .......................... 264/50; 294/51; 294/DIG. 5
[58] Field of Search .......................... 264/50, DIG. 5, 264/51

[56] References Cited

U.S. PATENT DOCUMENTS

| | | | |
|---|---|---|---|
| 2,714,747 | 8/1955 | Lindemann et al. | 264/50 |
| 2,751,627 | 6/1956 | Lindemann | 264/50 |
| 3,523,988 | 8/1970 | Roehr et al. | 264/50 |
| 4,424,287 | 1/1984 | Johnson et al. | 264/50 |
| 4,473,665 | 9/1984 | Martini-Vvedensky et al. | 521/79 |
| 4,649,001 | 3/1987 | Nakamura et al. | 264/50 |
| 5,034,171 | 7/1991 | Kiczek et al. | 264/51 |
| 5,158,986 | 10/1992 | Cha et al. | 521/82 |
| 5,160,674 | 11/1992 | Colton et al. | 264/50 |
| 5,180,751 | 1/1993 | Park et al. | 521/51 |
| 5,250,577 | 10/1993 | Welsh | 521/79 |
| 5,266,605 | 11/1993 | Welsh | 521/146 |
| 5,348,984 | 9/1994 | Lee | 521/79 |
| 5,416,129 | 5/1995 | Chandhary et al. | 521/79 |
| 5,589,519 | 12/1996 | Knaus | 264/50 |

FOREIGN PATENT DOCUMENTS

| | | | |
|---|---|---|---|
| 9347895f | 3/1980 | Japan . | |
| 5 50524 | 3/1993 | Japan | 264/50 |

OTHER PUBLICATIONS

M.C. Gabriel, "New Foam Extrusion Technology is Environmentally Friendly", *Plastic Technology*, Aug. 1995.

S.K. Dey, C. Jacob, M. Xanthos, "Inert–Gas Foam Extrusion of Rigid PVC Foam", *Antec*, May 7–11, 1995.

C. Jacob, S.K. Dey, "Inert Gasses as Alternative Blowing Agents for Extruded Low Density Polystyrene Foam", *Journal of Cellular Plastics*, Jan. 1995.

C. Jacob, S.K. Dey, J.A. Biesenberger, "Effect of Physical Blowing Agents on Crystallization Temperature of Polymer Melts", *Antec*, May 1–5, 1994.

C. Jacob, S.K. Dey, "Inert Gases as Alternative Blowing Agents for Extruded Low Density Polystyrene Foam", *Antec*, May 1–5, 1994.

"Inert Gas Foam Extrusion Technology", PPI Seminar, Somerset, N.J., Sep. 26, 1994.

S.K. Dey, "Low Density Foams From Environmentally Inert Physical Blowing Agents", PPI, Apr. 1993.

S. Dey, C. Jacob, M. Xanthos, "Monitoring Continuous Compounding Through On–Line Instrumentation", Society of Plastics Engineers, Nov. 30–Dec. 2, 1993.

S.K. Dey, "Instrumentation News: Measurement of Solubility of Gases in Polymer Melts", *Advances in Polymer Technology*, vol. 14, No. 4, pp. 327–328, 1990.

Debbie Stover, "Going For The Foam", *Plastics World*, pp. 33–37, Jul. 1994.

*Primary Examiner*—Allan R. Kuhns

[57] ABSTRACT

Thermoplastic foams are provided by a process in which a gaseous blowing agent of nitrogen, air, carbon dioxide, argon or mixtures thereof is injected into a melted thermoplastic polymer and the pressure is used to form a solution of the blowing agent and the melted polymer. The solution is cooled to a temperature which is within 10° C. of the polymer freezing point while the pressure is held to a point within which both of the following conditions exist: A) the pressure must be high enough to keep the gas blowing agent in the solution with the melt, and B) the pressure must be low enough to avoid adding more heat to the solution. Just before the cooled solution is extruded, it is important to have the solution at a temperature which is sufficiently uniform to make: A) the thermoplastic foam at least about 65% by volume in closed cells, and B) a substantially uniform cell size in the product. The cooled solution is then extruded out of an extruder die to where the pressure drop across the die is in the range of from about 70 to about 90% of the pressure in the extruder so that a cellular product is formed.

14 Claims, 1 Drawing Sheet

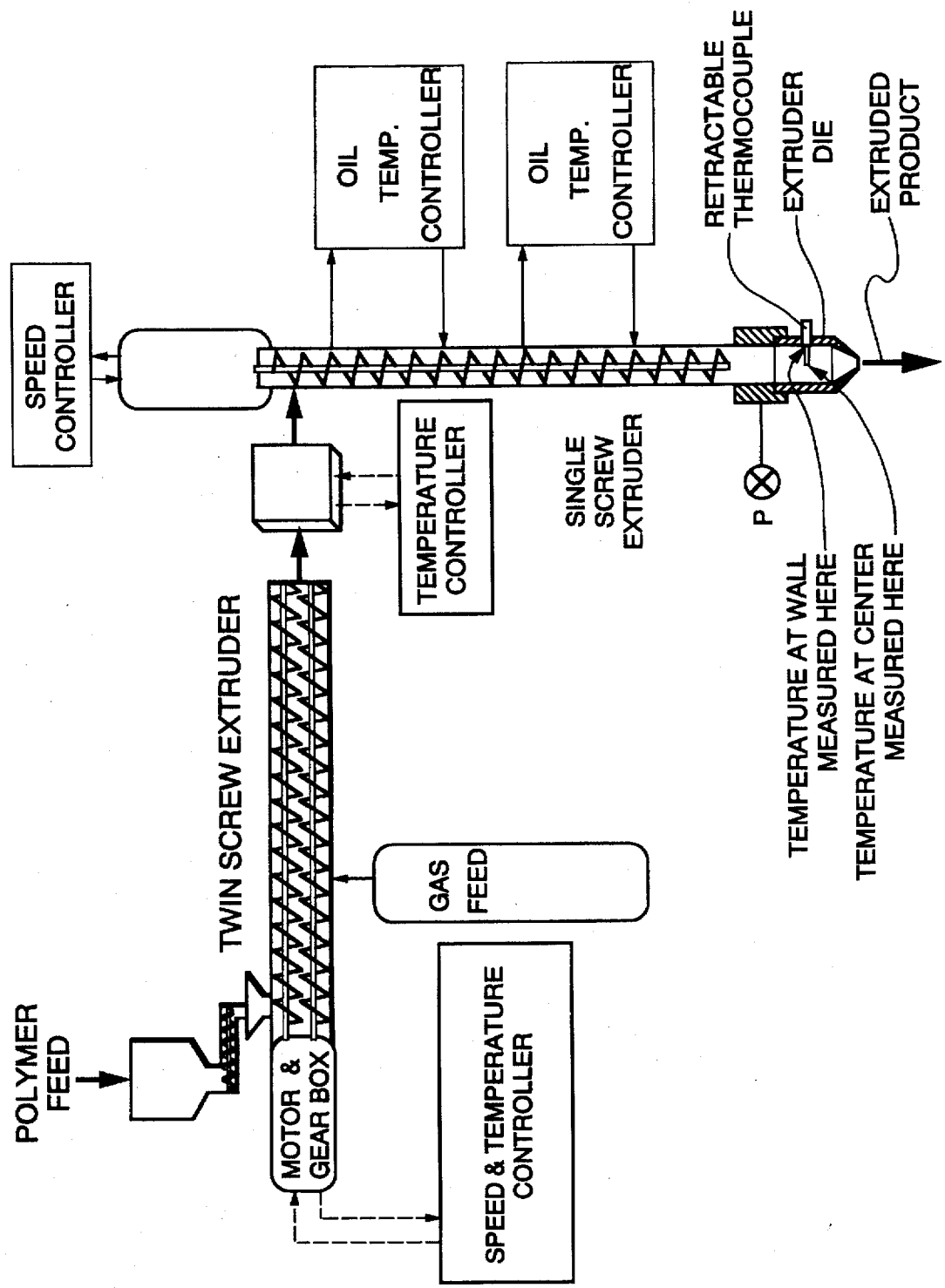

5,707,573

METHOD OF PREPARING THERMOPLASTIC FOAMS USING A GASEOUS BLOWING AGENT

BACKGROUND OF THE INVENTION

Field of the Invention

This invention relates to thermoplastic foam compositions and processes for their preparation. More specifically, environmentally friendly blowing agents are used in specific processes to provide the specified foam products.

Halogenated hydrocarbons have been used for years as blowing agents in many methods for the production of thermoplastic foams. While these CFC and HCFC compounds have many advantages in the production of thermoplastic foams, their use is being phased out due to the danger which they pose to the earth's ozone layer. Manufacturers of thermoplastic foamed products need alternatives to the halogenated hydrocarbons.

Related U.S. patents which have touched on the use of substitute blowing agents include U.S. Pat. No. 5,034,171. According to this reference, insoluble inert gas blowing agents are injected at pressures ranging from 200 to 2500 PSI into melted thermoplastic material to form a homogeneous dispersion of insoluble bubbles within the melted material. The gas blowing agents named here can include nitrogen, argon, xenon, krypton, helium and carbon dioxide.

Another related reference includes 5,266,605 and 5,250,577 which describe and claim a styrenic polymer foam blown solely with carbon dioxide, and the process for producing it. According to the process claimed in 5,250,577 from about 0.5 to about 6% of the carbon dioxide by weight of the polymer is fed in and mixed with the melted polymer. The mixture is extruded at a temperature below about 150° C. The foam produced has cells less than 1 millimeter in all directions.

U.S. Pat. No. 5,348,984 teaches the extrusion foaming of polyolefin where the blowing agent is a blend of carbon dioxide and a hydrocarbon selected from normal butane, isobutane, and propane. According to the reference the blowing agent is injected into the mixing zone of the extruder and forms a dispersion of bubbles which "eventually dissolve in the thermoplastic mass as the mixing continues and the pressure increases down the length of the extruder." According to the reference the expansion temperature is above the melting point of the mixture and is determined by a variety of particular processing factors, but for a low density polyethylene the expansion temperature is generally in the range of from about 85° to 102° C.

None of these references, however, teach a product with substantial cellular homogeneity and none of the processes require the temperature control of the extruding melt. It would be beneficial to have a process which is capable of delivering a thermoplastic product having at least about 50% of the cells in a closed cell formation, also with a substantially homogeneous cell size. Accordingly, it is an object of the present invention to provide such a process and product.

SUMMARY OF THE INVENTION

A critically controlled process and the resulting product is provided herein. Thermoplastic foams are produced by the process described herein using, as gaseous blowing agents, nitrogen, air, argon, carbon dioxide, and mixtures thereof.

In general, the thermoplastic foam product of the present invention has at least about 50% of the cells in a closed cell formation and a substantially homogeneous cell size in the product. These characteristics are found in the product as long as specific processing conditions are maintained.

The process begins by feeding a thermoplastic polymer or polymer melt into an extruder heated at a temperature high enough to form a melt with the polymer. The blowing agent is fed into the extruder at a pressure which is low enough to maintain the blowing agent as a gas, but high enough to at least begin to force the blowing agent into solution with the melted polymer. The extruder is used to move the melt and blowing agent mixture along the screw and the pressure is increased at the same time. The pressure is increased by the extruder to at least the value thermodynamically required to drive the blowing agent into solution with the melt. The blowing agent must dissolve in the melt completely. After the solution of polymer and blowing agent has formed, there must be no bubbles or pockets of blowing agent over the melt.

After the blowing agent and the melt have formed a solution, the solution is then cooled. In this step, as the melt solution is cooling, the pressure is limited to the following conditions: A) the pressure must be maintained high enough to keep the blowing agent in solution, and B) the pressure must be maintained low enough to avoid adding more heat to the melt. Within these conditions the pressure is held constant. Also in this step, the temperature of the solution must drop to within about 10° C. of the polymer melting point so that the melt can become a solid.

By the time the melt solution is moved to the extruder die, the temperature must be within about 10° C. of the polymer melting point (or glass transition temperature); at this temperature the solution must be at a point where the extruded polymer can expand and will solidify to provide the foam product.

In addition to this, it has been discovered that the temperature of the solution of the melt and blowing agent at the die must be held uniform within a specific temperature range. This means that in accordance with the present invention at the die at the exit of the extruder the temperature of the solution which is being extruded must be sufficiently uniform to: A) keep the subsequent product from collapsing, B) maintain a substantially closed cell formation (have at least about 50% by volume of the cells in a closed cell formation) in the subsequent product, and C) maintain a substantial uniformity in cell size in the subsequent product. When the process is used to prepare the preferred polyethylene thermal foam insulation then the temperature should be sufficiently uniform to make a foam having at least about 65% by volume in the closed cells.

When the solution is moved across the die there is a considerable pressure drop, with the final about 70 to about 90% of that pressure drop across the die itself. The pressure will drop from the relatively constant value which is herein previously described. After the pressure drop, just outside of the extruder, the foam product forms.

Preferred embodiments of this invention include the polyethylene foams blown by the above described process. These preferred polyethylene foams of the present invention have at least about 65% of the cells in a closed cell formation and either a porosity of at least about 80%. The most preferred thermally insulative foams of polyethylene (polyethylene insulation) have a density in the range of from about 1 to about 3 lb/ft$^3$.

BRIEF DESCRIPTION OF THE FIGURE

The FIGURE shows a preferred embodiment in which a twin screw extruder feeds a single screw extruder. Such an apparatus can be used to extrude a foam with any thermoplastic polymer.

The drawing shows the advantageous method of temperature control in which the solution temperature is cooled by using oil temperature controllers.

The drawing also shows that a retractable thermocouple can be used to measure the temperature of the melted polymer and blowing agent solution before the solution arrives at the die. Such a measurement is advantageous since, when the solution is extruding, the temperature of the solution must be in a sufficiently uniform temperature gradient (transverse to the flow of the solution in the extruder) to A) keep the subsequent product from collapsing, B) maintain a substantially closed cell formation in the subsequent product, and C) maintain a substantial uniformity in the cell size of the subsequent product.

DETAILED DESCRIPTION

Within this description, the phrase "melting point" refers to the point where the polymer changes either from a liquid melt to a solid or from a solid to a melt. The phrase herein will also refer to the glass transition (Tg) temperature of the non-crystalline polymers which tend to soften over a range in addition to referring to the melting-freezing point of crystalline type polymers which do have a more precise point of softening.

In this description, "solution" will refer to the solution of the blowing agent and the polymer melt. Herein also, "substantially closed cell" means that at least about 50% of the cells in the foam are in a closed cell formation. Also in this description, the "substantial uniformity in cell size" which is produced as a result of the uniformity of temperature in the melt before extrusion means that at least about 50% of the cells have a diameter that is within 50% of the size of the average cell's diameter.

To prepare the foams of the present invention, a thermoplastic polymer is melted, and the gas blowing agent is then fed in at a pressure which maintains the agent as a gas, but is high enough to begin to force the blowing agent into solution with the polymer melt. When the blowing agent is 90 to 100% carbon dioxide then the pressure to inject the blowing agent acceptably will be in the range of from about 100 to about 950 pounds per square inch (PSI), and preferably it will be in the range of from about 500 to about 950 PSI. For the preferred mixtures of blowing agent that is from about 75 to about 25% by wt. carbon dioxide and from about 25 to about 75% by wt. argon, air, nitrogen or mixtures there of, the injection pressure will be in the range of from about 100 to about 1,600 PSI. When using argon, nitrogen, air or mixtures thereof as the blowing agent, a suitable injection pressure can be in the range of from about 100 to about 3,000 PSI, preferably the injection pressure will be in the range of from about 300 to about 1,200 PSI.

Whatever blowing agent is used, the next step critically requires that the extruder build enough pressure to force the blowing agent into solution with the polymer melt. The necessary goal of this step of the process is to form a solution of the polymer melt and blowing agent. A homogeneous solution must be formed so that, for the cooling step there is no pockets or bubbles of blowing agent above or with the solution. In this step, for a blowing agent that is from about 90 to 100% carbon dioxide the pressure will be up to about 2500 PSI. For mixtures of blowing agents that are from about 75 to about 25% by weight (wt.) carbon dioxide and from about 25 to about 75% by wt. argon, air, nitrogen or mixtures there of, the pressure will be up to about 3,000 PSI.

When using argon, nitrogen, air or mixtures thereof as the blowing agent, suitably the pressure will be up to about 4,000 PSI.

After the blowing agent and polymer melt have formed a solution, the solution must then be cooled. When cooling, it is important that the pressure be controlled so that no blowing agent is permitted to come out of the solution (through, for example, a pressure drop), and also so that no more heat is added to the solution by an increase of pressure. The pressure is controlled within these two requirements while cooling the solution of blowing agent and polymer melt. Preferably, a fluid temperature controller is used to cool the melt.

By the time the solution has been moved to the extruder die it must have been cooled to a selected temperature which is within about 10° C. of the polymer melting point (or Tg). When the cooled solution is extruded, it must be at a temperature which is close enough to the polymer melting point to allow the expansion of the polymer to form a solid foam which, furthermore, should solidify in the substantially closed cellular form before the blowing agent escapes.

In addition to this, however, it has been found that it is important to maintain a sufficiently uniform transverse temperature gradient in the solution when it is located at the extruding die just before it exits the extruder. In a direction which is perpendicular to the flow of the solution (transverse to the flow), the temperature along all points of the solution must not be outside of a 5° C. range, provided however that the temperature of the solution is set within about 10° C. of the polymer melting point where the melt becomes a solid. This stabilization of the solution temperature at the die inside the extruder is maintained because the temperature of the polymer solution which is being extruded should be sufficiently uniform to: A) keep the subsequent product from collapsing, B) maintain a substantially closed cell formation in the subsequent product, and C) maintain a substantial uniformity in the cell size of the subsequent product. This means that at the center of the solution the temperature can not be more than 5° C. away from the temperature of the solution at the outer part of the polymer flow at any point near the wall of the extruder. This is true of all polymers, including polyethylene.

For a more preferred product (such as polyethylene insulation) the solution temperature should be maintained within a 3° C. range in the extruder just before the extruder die along all points of the solution in any line perpendicular to the flow of the solution. Thus, although the temperature is selected within 10° C. of the polymer melting point, the temperature of the cooled solution at all points just before extrusion must be within a 3° C. range to extrude a preferred product. This means that at the center of the solution the temperature is preferred to be no more than 3° C. away from the temperature of the solution at the outer part of the polymer flow near any point of the wall of the extruder.

Most preferably with the most preferred polyethylene insulation, at the extruder die, but before extruding and at any point in any direction perpendicular to the flow of the solution, the temperature will be so uniform that there is a temperature gradient no more than 1° C. wide. This means that although the temperature of the solution is selected within 10° C. of the polymer melting point, the temperature of the cooled solution at all points just before extrusion must be within a 1° C. range. Thus, at the center of the solution the temperature of the polymer melt can not be more than 1° C. away from the temperature of the solution at the outer part of the flow near the wall of the extruder. Although this only allows narrow range for the solution temperature, it has been discovered that a superior product having the cells in a substantially closed cell formation is obtained in the polyethylene foam product when this is done. This requirement is therefore ideal for producing polyethylene foam insulation.

At the die inside the extruder the pressure on the solution will still be high enough to keep the blowing agent in solution with the polymer. It is essential to have most of the pressure drop (about 70 to 90%), from inside to outside the extruder, occur across the die to prevent premature foam formation before the solution exits. Within this pressure drop, the blowing agent expands, allowing the foam to form outside of the extruder. The blowing agent leaves the polymer solution and becomes gaseous as the foam is formed.

The residence time of the polymer in the pressure drop area will be within from about 1 to about 10% of the hold up time of the extruder. The distance within which the pressure drop occurs is thus determined by the speed of the polymer flow. Those of ordinary skill will be aware that the "hold up time" of the extruder is the capacity of the machine/throughput. Throughput and capacity can be specified in terms of either mass or volume.

Although any extruder (for example, a single screw or a twin screw extruder) can be used to prepare the foams of the present invention it is preferred to use a tandem extruder system in which there is at least two extruders, one feeding the other. When using a system of extruders in tandem, the solution of the melt and blowing agent has more time to be formed in the first extruder, and is more easily cooled in the second while maintaining the pressure constantly under conditions which permit no more mechanical heat to be added to the solution and also keep the blowing agent from coming out of the solution. For producing the polyethylene foams it is preferred that a twin screw extruder feed a single screw extruder. In a system with multiple extruders in tandem the pressure can be increased and used to force the blowing agent into solution in one extruder. Then, when the solution has formed and has no bubbles of blowing agent the solution passes along the system to the stage where it is cooled while maintaining the pressure under the previously indicated constant pressure conditions.

Ingredients such as nucleating agents, pigments, fire retardants, diffusivity modifiers and any other additives conventionally known in the art can be added (preferably with the polymer) and used in the thermoplastic foam of the present invention.

Nucleating agents can be used. Generally these are included at an amount in the range of from about 0.001 to about 10% by weight of the total polymer. Preferably, the amount of nucleating agent is in the range of from about 0.1 to about 3% by weight of the total polymer. Nucleating agents which can be used include talc, zinc oxide, and mixtures of sodium bicarbonate and citric acid. In preferred embodiments a mixture of sodium bicarbonate and citric acid is used as the nucleating agent.

In other preferred embodiments, the gas blowing agents of argon, nitrogen, air and mixtures thereof can be mixed with carbon dioxide and used as a nucleating agent for the carbon dioxide. Such gas agents can be present at an amount of from about 0.5 to about 10% by weight of the total amount of blowing agent used. Another preferred embodiment is obtained by using carbon dioxide at an amount in the range of from about 25 to about 75% by weight of the blowing agent and having from about 75 to about 25% of the blowing agent selected from the group consisting of argon, air, nitrogen and mixtures thereof.

In other embodiments, carbon black can optionally be used as a pigment, and/or glycerol monostearate can optionally be used as a diffusivity modifier.

Any thermoplastic polymer can be used in the process described herein to make the foams of the present invention. This includes both homopolymers, copolymers and suitable mixtures (blends) thereof. Polyolefin (both homopolymers and copolymers) is preferred. Mixtures of polyolefin which, for example, can be used includes blends of polyethylene and polypropylene and polymers and copolymers of other olefins (including diolefins). Polymers which can be used to make the foams of the present invention includes but is not limited to: polystyrene, polyvinyl chloride, thermoplastic polyurethane, polyethylene, polypropylene and other olefinic polymers and copolymers and blends thereof.

The polyvinylchloride foam is preferably a low porosity foam. The porosity is preferably in the range of from about 10 to about 60% by volume. The other foams of the present invention are polymer foams (including polyethylene) which preferably have a porosity with at least about 75% of its volume in pore space, preferably the porosity is in the range of from about 75 to about 98% by volume.

In another preferred embodiment, the present invention provides foam insulation which comprises a polyethylene foam having a closed cell formation in at least about 65% of the cells, and either a porosity of at least about 80%; most preferably a density in the range of from about 3 to about 1 $lb/ft^3$.

To obtain lower density products, the amount of blowing agent can be increased relative to the amount of polymer. In such a case, the pressure may have to be increased to force the higher amount of blowing agent into solution with the melt.

EXAMPLES

The present invention will be better understood from the following examples. These examples are given to illustrate the instant invention and should not be taken to limit it. All parts and percentages are by weight unless otherwise indicated.

Example 1

Dow 640 low density polyethylene (ldpe) having a melt flow index (MFI) of 2.0 and melt elasticity index (MEI) of 0.94 was used to prepare a closed cell foam. The MFI was found by ASTM D1238, and the MEI is the number of strain units (SU) the polymer melt recovers at infinite time after being strained 11 SU at a rate of 1 SU/sec at a temperature of 190° C.

To obtain the foam, a tandem extruder arrangement was used in which a twin screw extruder fed a single screw extruder. The twin screw extruder line had two 34 mm (millimeter) diameter (Leistritz) co-rotating, intermeshing twin screws with a length to diameter ratio of 40. The second extruder (the cooling extruder) was a 40 mm in diameter single screw extruder having a length to diameter ratio of 33.

The rotational speed of the twin screw extruder was 150 RPM (revolutions per minute) and the rpm of the single screw extruder was 8.

The polymer pellets were fed into the twin screw extruder at a rate of 26 g/min (grams/minute). In the second part of the extruder, nitrogen gas blowing agent was fed in at 420 PSI (pounds per square inch). The gas flow rate was measured to be 0.28 SLPM (standard liters per minute). The polymer melt and the gas mixture was compressed to 3000

PSI in the third part of the twin screw extruder. The temperature of the melt at this point was measured using a melt thermocouple, and was found to be 213° C.

The melt was fed into the single screw extruder, the barrel of which was cooled by circulating oil. The first oil circulator temperature was set at 127° C. and the second oil circulator temperature was set at 115° C. The third and fourth oil circulator temperatures were set at 108° C. and 109° C. respectively.

A 0.082 inch diameter, zero land length rod die was used to extrude the foam. A static mixer and breaker plate was installed before the die. The melt pressure before the die was measured to be 710 PSI. The melt temperature was measured using a manually retractable thermocouple. The melt temperature at the center of the melt stream was measured to be 108° C. and the difference between the melt temperatures at the wall and the center was found to be less than 3° C.

A closed cell product was obtained which had a density of 0.2 g/cc (grams per cubic centimeter) and cells less than 0.1 mm in diameter. The cell sizes near the wall of the product and at its center were substantially uniform.

Example 2

A foam was produced using the same type of polyethelene as was used in Example 1.

A tandem extruder arrangement was used in which a twin screw extruder fed a single screw extruder. The twin screw extruder line had two 34 mm diameter (Leistritz) co-rotating, intermeshing twin screws with a length to diameter ratio of 40. The second extruder (the cooling extruder) was a 25.4 mm in diameter single screw extruder having a length to diameter ratio of 20.

The rotational speed of the twin screw extruder was 100 RPM and the single screw extruder was set at 6 RPM.

The polymer pellets were fed into the twin screw extruder at a rate of 19.4 g/min. In the second part of the extruder, the carbon dioxide gas blowing agent was fed in at 500 PSI (pounds per square inch). The gas flow rate was measured to be 1.0 SLPM. The polymer melt and the gas mixture was compressed to 2450 PSI in the third part of the twin screw extruder. The temperature of the melt at this point was measured using a melt thermocouple, and was found to be 179° C.

The melt was fed into the single screw extruder, the barrel of which was cooled by circulating oil. The first oil circulator temperature was set at 114° C. and the second oil circulator temperature was set at 114° C.

A 1/8 inch diameter, zero land length rod die was used to extrude the foam. The melt pressure before the before the die was measured to be 760 PSI. The melt temperature was measured using a manually retractable thermocouple. The melt temperature at the center of the melt stream was measured to be 106.7° C. and at the wall it was 104.4° C.

A closed cell product was obtained which had a density of 0.075 g/cc (grams per cubic centimeter) and its cell sizes between 0.5 and 0.75 mm in diameter.

Example 3

A low density polyethylene (LDPE) resin from Mobil (LMA003) was used to prepare a closed cell foam.

A tandem extruder arrangement was used in which a twin screw extruder fed a single screw extruder. The twin screw extruder line had two 34 mm diameter (Leistritz) co-rotating, intermeshing twin screws with a length to diameter ratio of 40. The second extruder (the cooling extruder) was a 40 mm in diameter single screw extruder having a length to diameter ratio of 33.

The rotational speed of the twin screw extruder was 250 RPM and the single screw extruder was 25 RPM.

The polymer pellets were fed into the twin screw extruder at a rate of 60 g/min. In the second part of the extruder, the carbon dioxide gas blowing agent was fed in at 950 PSI. The gas flow rate was measured to be 4.0 SLPM. The polymer melt and the gas mixture was compressed to 2000 PSI in the third part of the twin screw extruder. The temperature of the melt at this point was measured using a melt thermocouple, and was found to be 233° C.

The melt was fed into the single screw extruder, the barrel of which was cooled by circulating oil. The first oil circulator temperature was set at 121° C. and the second oil circulator temperature was set at 106° C. The third and fourth oil circulator temperatures were set at 95° C. and 108° C. respectively.

A 0.082 inch diameter zero land length rod die was used to extrude the foam. A static mixer and breaker plate was used before the die. The melt pressure before the before the die was measured to be 820 PSI. The melt temperature was measured using a manually retractable thermocouple. The melt temperature at the center of the melt stream was measured to be 107.9° C. and the difference between the melt temperatures at the wall and at the center of the melt was less than 0.1° C.

A closed cell product was obtained which had a density of 0.046 g/cc and its cell sizes between 0.4 and 0.5 mm in diameter.

Example 4

A low density polyethylene (LDPE) resin from Mobil (LMA003) with 0.05% Safoam PT (a mixture of sodium bicarbonate and citric acid used as a nucleating agent, from Reedy International) was used to prepare a closed cell foam.

A tandem extruder arrangement was used in which a twin screw extruder fed a single screw extruder. The twin screw extruder line had two 34 mm diameter (Leistritz) co-rotating, intermeshing twin screws with a length to diameter ratio of 40. The second extruder (the cooling extruder) was a 40 mm in diameter single screw extruder having a length to diameter ratio of 33.

The rotational speed of the twin screw extruder was 150 RPM and the single screw extruder was 25 RPM.

The polymer pellets were fed into the twin screw extruder at a rate of 60 g/min. In the second part of the extruder, the carbon dioxide gas blowing agent was fed in at 700 PSI. The gas flow rate was measured to be 5.0 SLPM. The polymer melt and the gas mixture was compressed to 2000 PSI in the third part of the twin screw extruder. The temperature of the melt at this point was measured using a melt thermocouple, and was found to be 209° C.

The melt was fed into the single screw extruder, the barrel of which was cooled by circulating oil. The first oil circulator temperature was set at 120° C. and the second oil circulator temperature was set at 110° C. The third and fourth oil circulator temperatures were set at 106° C. and 109° C. respectively.

A 0.086 inch diameter zero land length rod die was used to extrude the foam. A static mixer and breaker plate was used before the die. The melt pressure before the before the die was measured to be 700 PSI. The melt temperature was measured using a manually retractable thermocouple. The melt temperature at the center of the melt stream was measured to be 107° C. and the difference between the melt temperatures at the wall and at the center of the melt was less than 1.0° C.

A closed cell product was obtained which had a density of 0.051 g/cc and its cell sizes between 0.3 and 0.4 mm in diameter. It was noted that the cell sizes near the wall and at the center of the extruded product were substantially the same (the cells were thus, substantially uniform).

Example 5

A polypropylene homopolymer (6523 from Himont) was extruded to prepare a closed cell foam product. The homopolymer had an MFI of 3.24 (found by ASTM D1238) and an MEI of 0.74. The MEI is the number of strain units (SU) that the polymer recovers at infinite time after being strained 11 SU at a rate of 1 SU/sec at a temperature of 230° C.

A tandem extruder arrangement was used in which a twin screw extruder fed a single screw extruder. The twin screw extruder line had two 34 mm diameter (Leistritz) co-rotating, intermeshing twin screws with a length to diameter ratio of 40. The second extruder (the cooling extruder) was a 40 mm in diameter single screw extruder having a length to diameter ratio of 33.

The rotational speed of the twin screw extruder was 150 RPM and the single screw extruder was 12 RPM.

The polymer pellets were fed into the twin screw extruder at a rate of 26 g/min. In the second part of the extruder, the carbon dioxide gas blowing agent was fed in at 1200 PSI. The gas flow rate was measured to be higher than 5.0 SLPM (the limit of the gas flow meter). The polymer melt and the gas mixture was compressed to 1500 PSI in the third part of the twin screw extruder. The temperature of the melt at this point was measured using a thermocouple, and was found to be 175° C.

The melt was fed into the single screw extruder, the barrel of which was cooled by circulating oil. The first oil circulator temperature was set at 190° C. and the second oil circulator temperature was set at 165° C. The third and fourth oil circulator temperatures were set at 160° C. and 165° C. respectively.

A ⅛ inch diameter zero land length rod die was used to extrude the foam. A static mixer and breaker plate was used before the die. The melt pressure before the before the die was measured to be 1500 PSI. The melt temperature was measured using a manually retractable thermocouple. The melt temperature at the center of the melt stream was measured to be 158° C. and the temperature at the wall was measured to be 162° C., a difference between of 4° C.

A closed cell product was obtained which had a density of 0.07 g/cc and its cell sizes between 0.1 and 0.2 mm in diameter.

Example 6

A copolymer of polypropylene (7523 from Himont) was used along with 0.5% Safoam FP (nucleating agent from Reedy International) to extrude a closed cell foam product.

A tandem extruder arrangement was used in which a twin screw extruder fed a single screw extruder. The twin screw extruder line had two 34 mm diameter (Leistritz) co-rotating, intermeshing twin screws with a length to diameter ratio of 40. The second extruder (the cooling extruder) was a 40 mm in diameter single screw extruder having a length to diameter ratio of 33.

The rotational speed of the twin screw extruder was 130 RPM and the single screw extruder was 7 RPM.

The polymer pellets were fed into the twin screw extruder at a rate of 26 g/min. In the second part of the extruder, the carbon dioxide gas blowing agent was fed in at 650 PSI. The gas flow rate was measured to be 2.4 SLPM. The polymer melt and the gas mixture was compressed to 1360 PSI in the third part of the twin screw extruder. The temperature of the melt at this point was measured using a thermocouple, and was found to be 201° C.

The melt was fed into the single screw extruder, the barrel of which was cooled by circulating oil. The first oil circulator temperature was set at 193° C. and the second oil circulator temperature was set at 168° C. The third and fourth oil circulator temperatures were set at 163° C. and 163° C. respectively.

A ¹⁄₃₂ inch diameter zero land length four strand rod die was used to extrude the foam. A static mixer and breaker plate was used before the die. The melt pressure before the before the die was measured to be 750 PSI. The melt temperature was measured using a manually retractable thermocouple. The melt temperature at the center of the melt stream was measured to be 152.8° C.

A closed cell product was obtained which had a density of 0.075 g/cc and its cell sizes between 0.1 and 0.2 mm in diameter.

Example 7

A rigid Polyvinyl chloride (PVC) resin (4210) from Rimtec) was used to prepare a closed cell foam.

A single screw extruder was used to make the foam. The extruder line had a 1.25 inch diameter screw with a length to diameter ratio of 40, and was used at 35 RPM.

The polymer pellets were fed into the twin screw extruder at a rate of 67 g/min. In the second part of the extruder, the carbon dioxide gas blowing agent was fed in at 350 PSI. The gas flow rate was measured to be 0.9 SLPM. The polymer melt and the gas mixture was compressed to 900 PSI in the third part of the twin screw extruder. The temperature of the melt at this point was measured using a thermocouple, and was found to be 176° C.

The temperature controller set points from the hopper to the die were: 200, 350, 360, 360 360, 350, 330 330, 310, and 315° F.

A closed cell product with a density of 0.5 g/cc and a cell size between 1.0 and 1.5 mm was obtained using a ¼ inch rod die with zero land length.

Example 8

A polystyrene resin (6851 from Dow) was used to prepare a closed cell foam.

A twin screw extruder was used to obtain the foam. The extruder had 34 mm diameter (Leistritz) co-rotating, intermeshing twin screws with a length to diameter ratio of 40. The rotational speed was 20 RPM.

The polymer pellets were fed into the twin screw extruder at a rate of 15 g/min. In the second part of the extruder, the carbon dioxide gas blowing agent was fed in at 1000 PSI. The gas flow rate was measured to be 1.0 SLPM. The polymer melt and the gas mixture was compressed to 2200 PSI in the third part of the twin screw extruder. The temperature of the melt at this point was measured using a thermocouple, and was found to be 141° C. A 0.082 inch diameter zero land length rod die was used to extrude the foam. A static mixer and breaker plate were used before the die.

A closed cell product was obtained which had a density of 0.046 g/cc and a cell size of 0.5 mm. The cell sizes near the wall and at the center were about the same, thus, the product had a homogeneous cell size.

We claim:

1. A process for making a cellular thermoplastic structure comprising the steps of:

feeding a polymer into an extruder;

melting the polymer in the extruder to form a melt;

feeding a gaseous blowing agent into the extruder at a pressure which is low enough to maintain the blowing agent as a gas, but which is high enough to at least begin to force the blowing agent to form a solution with the melt, further providing that the gaseous blowing agent is nitrogen, air, argon, carbon dioxide or mixtures thereof;

increasing pressure by means of the extruder wherein the pressure is increased to at least the value thermodynamically required to force the rest of the gas blowing agent into solution with the melt;

cooling the solution to form a cooled solution at a temperature which is within 10° C. of the polymer solidification point while the pressure is held to a point within which both of the following conditions exist: A) the pressure must be high enough to keep the gas blowing agent in the solution with the melt, and B) the pressure must be low enough to avoid adding more heat to the solution;

moving the cooled solution in a first direction along the extruder to a die where, in a second direction which is perpendicular to the first direction and is across the cooled solution, the temperature of the cooled solution in a direction transverse to the flow of the solution inside the extruder is in a temperature gradient so that before extruding, the cooled solution at a wall of the extruder is at a temperature which is within 5° C. of the temperature of the polymer inside the solution: A) to allow extrusion to make a cellular product which is at least about 50% by volume in closed cells and B) to allow extrusion to make a substantially uniform cell size in the product; and extruding the cooled solution across and out of the die so that a pressure drop occurs across the die wherein said pressure drop is in the range of from about 70 to about 90% so that the cellular product is formed.

2. The process of claim 1 wherein the transverse temperature gradient is sufficiently uniform so that before extruding, the cooled solution at a wall of the extruder is at a temperature which is within 3° C. of temperature of the polymer inside the solution.

3. The process of claim 1 which was conducted in a tandem extrusion system in which a double screw extruder feeds a single screw extruder.

4. The process of claim 1 which was conducted in a tandem extrusion system having two extruders in which a first extruder feeds a second extruder which has a fluid temperature controller.

5. The process of claim 1 wherein a nucleating agent is added with the polymer.

6. The process of claim 1 wherein the nucleating agent is talc, zinc oxide, or a mixture of sodium bicarbonate and citric acid.

7. The process of claim 1 wherein the gas blowing agent is a mixture with argon, nitrogen or air being present at an amount in the range of from about 0.5 to about 10% by weight of the total gas blowing agent, and the rest of the blowing agent being carbon dioxide.

8. The process of claim 1 wherein the gas blowing agent is from about 25 to about 75% by weight carbon dioxide and has from about 75 to about 25% selected from the group consisting of argon, air, nitrogen and mixtures thereof.

9. A process for making a cellular thermoplastic structure comprising the steps of:

feeding polyethylene into an extruder;

melting the polyethylene in the extruder to form a melt;

feeding a gaseous blowing agent into the extruder at a pressure which is low enough to maintain the blowing agent as a gas, but which is high enough to at least begin to force the blowing agent to form a solution with the melt, further providing that the gaseous blowing agent is nitrogen, air, argon, carbon dioxide or mixtures thereof;

increasing pressure by means of the extruder wherein the pressure is increased to at least the value thermodynamically required to force the rest of the gas blowing agent into solution with the melt;

cooling the solution to form a cooled solution at a temperature which is within 10° C. of the polymer solidification point while the pressure is held to a point within which both of the following conditions exist: A) the pressure must be high enough to keep the gas blowing agent in the solution with the melt, and B) the pressure must be low enough to avoid adding more heat to the solution;

moving the cooled solution in a first direction along the extruder to a die where, in a second direction which is perpendicular to the first direction and is across the cooled solution, the temperature of the cooled solution in a direction transverse to the flow of the solution inside the extruder is in a temperature gradient so that before extruding, the cooled solution at a wall of the extruder is at a temperature which is within 5° C. of the temperature of the polyethylene inside the solution: A) to allow extrusion to make a cellular product which is at least about 65% by volume in closed cells and B) to allow extrusion to make a substantially uniform cell size in the product; and extruding the cooled solution across and out of the die so that a pressure drop occurs across the die wherein said pressure drop is in the range of from about 70 to about 90% so that a cellular polyethylene insulation product is formed which has a density in the range of from about 1 to about 3 pounds per cubic foot.

10. The process of claim 9 wherein the transverse temperature gradient is sufficiently uniform so that before extruding, the cooled solution at a wall of the extruder is at a temperature which is within 3° C. of the temperature of the polyethylene inside the solution.

11. The process of claim 9 which was conducted in a tandem extrusion system in which a double screw extruder feeds a single screw extruder.

12. The process of claim 9 which was conducted in a tandem extrusion system having two extruders in which a first extruder feeds a second extruder which has a fluid temperature controller.

13. The process of claim 9 wherein a nucleating agent is added with the polyethylene.

14. The process of claim 13 wherein the nucleating agent is talc, zinc oxide, or a mixture of sodium bicarbonate and citric acid.

* * * * *